(12) United States Patent
Khadilkar et al.

(10) Patent No.: US 11,194,789 B2
(45) Date of Patent: Dec. 7, 2021

(54) CONTENT AGNOSTIC MEMORY PAGEABLE STORAGE MODEL

(71) Applicant: SAP SE, Walldorf (DE)

(72) Inventors: Pushkar Khadilkar, Pune (IN); Colin Florendo, Marlborough, MA (US); Amit Pathak, Pune (IN)

(73) Assignee: SAP SE, Walldorf (DE)

( * ) Notice: Subject to any disclaimer, the term of this patent is extended or adjusted under 35 U.S.C. 154(b) by 41 days.

(21) Appl. No.: 16/858,344

(22) Filed: Apr. 24, 2020

(65) Prior Publication Data

US 2020/0387305 A1 Dec. 10, 2020

Related U.S. Application Data

(60) Provisional application No. 62/858,693, filed on Jun. 7, 2019.

(51) Int. Cl.
*G06F 12/00* (2006.01)
*G06F 16/23* (2019.01)
(Continued)

(52) U.S. Cl.
CPC ........ *G06F 16/2379* (2019.01); *G06F 3/0604* (2013.01); *G06F 3/064* (2013.01);
(Continued)

(58) Field of Classification Search
CPC ............. G06F 16/2379; G06F 16/2272; G06F 16/2219; G06F 16/221; G06F 16/2237; G06F 9/4843; G06F 16/2255; G06F 12/0875; G06F 16/24558; G06F 16/24552; G06F 16/2228; G06F 16/2282; G06F 3/0604; G06F 3/064; G06F 3/0673; G06F 12/0223; G06F 2212/1024; G06F 2212/1044

See application file for complete search history.

(56) References Cited

U.S. PATENT DOCUMENTS 9,817,858 B2  11/2017  Eisenreich et al.
9,852,169 B2  12/2017  Faerber et al.
(Continued)

OTHER PUBLICATIONS

Abadi, S. et al., "The Design and Implementation of Modern Column-Oriented Database Systems," Foundations and Trends in Databases, vol. 5, No. 3, Now Publishers Inc., 2012, pp. 177-280.
(Continued)

*Primary Examiner* — John A Lane
(74) *Attorney, Agent, or Firm* — Sterne, Kessler, Goldstein & Fox P.L.L.C.

(57) ABSTRACT

Disclosed herein are system, method, and computer program product embodiments for storing an object onto a first or second page. An embodiment operates by receiving the object and determining that the first page has sufficient unused space for storing at least one byte of the object. Thereafter, a data block of the object is created to comprise at least one byte of the object. The data block is then stored on the first page or the second page, and a location of the object's first data block is recorded. Thereafter, a pointer corresponding to the location of the object's first data block for loading the object is provided.

20 Claims, 6 Drawing Sheets

(51) Int. Cl.

| | |
|---|---|
| G06F 12/02 | (2006.01) |
| G06F 3/06 | (2006.01) |
| G06F 16/22 | (2019.01) |
| G06F 12/0882 | (2016.01) |
| G06F 16/2455 | (2019.01) |
| G06F 12/0875 | (2016.01) |
| G06F 9/48 | (2006.01) |

(52) U.S. Cl.
CPC .......... *G06F 3/0673* (2013.01); *G06F 9/4843* (2013.01); *G06F 12/0223* (2013.01); *G06F 12/0246* (2013.01); *G06F 12/0875* (2013.01); *G06F 12/0882* (2013.01); *G06F 16/221* (2019.01); *G06F 16/2219* (2019.01); *G06F 16/2228* (2019.01); *G06F 16/2237* (2019.01); *G06F 16/2255* (2019.01); *G06F 16/2272* (2019.01); *G06F 16/2282* (2019.01); *G06F 16/24552* (2019.01); *G06F 16/24558* (2019.01); *G06F 2212/1024* (2013.01); *G06F 2212/1044* (2013.01)

(56) References Cited

U.S. PATENT DOCUMENTS

| | | | | |
|---|---|---|---|---|
| 2009/0276602 | A1* | 11/2009 | Chedru | G06F 12/023 711/171 |
| 2015/0242271 | A1* | 8/2015 | Bennett | G06F 3/064 714/773 |
| 2016/0012089 | A1 | 1/2016 | Sherkat et al. | |
| 2017/0322960 | A1* | 11/2017 | Glebe | G06F 16/2228 |
| 2017/0336992 | A1* | 11/2017 | Rostock | G06F 3/0652 |
| 2018/0018218 | A1* | 1/2018 | Rat | G06F 11/1004 |
| 2020/0241792 | A1* | 7/2020 | Thomsen | G06F 3/0608 |
| 2020/0387502 | A1* | 12/2020 | Florendo | G06F 9/4843 |

OTHER PUBLICATIONS

Aken, D.V. et al., "Automatic Database Management System Tuning Through Large-scale Machine Learning," ACM SIGMOD '17, May 14-19, 2017, pp. 1009-1024.

Alexiou, K. et al. "Adaptive Range Filters for Cold Data: Avoiding Trips to Siberia," Proc. of the VLDB Endowment, vol. 6, No. 14, 2013, pp. 1714-1725.

Anderson, T., "Microsoft SQL Server 14 man: Nothing stops a Hekaton transaction," The Register, printed from http://www.theregister.co.uk/2013/06/03/microsoft_sql_server_14_teched/, Jun. 3, 2013, 8 pages.

Andrei, M. et al., "SAP HANA Adoption of Non-Volatile Memory," Proc. of the VLDB Endowment, vol. 10, No. 12, 2017, pp. 1754-1765.

Anh, V.N. and Moffat, A., "Index compression using 64-bit words," Software—Practice and Experience, vol. 40, 2010, pp. 131-147.

Arulraj, J. et al., "Multi-Tier Buffer Management and Storage System Design for Non-Volatile Memory," arXiv:1901.10938v1 [cs.DB], Jan. 30, 2019, 17 pages.

Belazzougui, D. et al., "Hash, displace, and compress," Algorithms—ESA 2009, Proc. 17th Annual European Symposium, Copenhagen, Denmark, Sep. 7-9, 2009, pp. 682-603.

Bhattacharjee, B. et al., "Efficient Index Compression in DB2 LUW," VLDB '09, vol. 2, No. 2, 2009, pp. 1462-1473.

Do, J. et al., "Turbocharging DBMS Buffer Pool Using SSDs," ACM SIGMOD, 2011, pp. 1113-1124.

Eldawy, A. et al., "Spatial Partitioning Techniques in SpatialHadoop," Proc. of the VLDB Endowment, vol. 8, No. 12, 2015, pp. 1602-1605.

Elghandour, I. et al., "An XML Index Advisor for DB2," ACM SIGMOD'08, Jun. 9-12, 2008, 4 pages.

Finkelstein, S. et al., "Physical Database Design for Relational Databases," ACM Trans. on Database Systems, vol. 13, No. 1, Mar. 1988, pp. 91-128.

Graefe, G. et al., "In-memory Performance for Big Data," Proc. of the VLDB Endowment, vol. 8, No. 1, 2014, pp. 37-48.

Graefe, G., "Volcano—An Extensible and Parallel Query Evaluation System," IEEE Trans. on Knowledge and Data Engineering, vol. 6, No. 1, Feb. 1994, pp. 120-135.

Gurajada, A. et al., "BTrim—Hybrid In-Memory Database Architecture for Extreme Transaction Processing in VLDBs," Proc. of the VLDB Endowment, vol. 11, No. 12, 2018, pp. 1889-1901.

Lang, H. et al., Data Blocks: Hybrid OLTP and OLAP on Compressed Storage using both Vectorization and Compilation. ACM SIGMOD, 2016, pp. 311-326.

Larson, P. et al., "Real-Time Analytical Processing with SQL Server," Proc. of the VLDB Endowment, vol. 8, No. 12, Aug. 31-Sep. 4, 2015, pp. 1740-1751.

Lee, J. et al., "Hybrid Garbage Collection for Multi-Version Concurrency Control in SAP HANA," ACM SIGMOD, Jun. 26-Jul. 1, 2016, pp. 1307-1318.

Leis, V. et al., "LeanStore: In-Memory Data Management Beyond Main Memory," IEEE ICDE, 2018, pp. 185-196.

Lemke, C. et al., "Speeding Up Queries in Column Stores—A Case for Compression," DAWAK, 2010, pp. 117-129.

Liu, X. and Salem, K., "Hybrid Storage Management for Database Systems," Proc. of the VLDB Endowment, vol. 6, No. 8, Aug. 26-30, 2013, pp. 541-552.

Majewski, B.S. et al., "A Family of Perfect Hashing Methods," The Computer Journal, vol. 39, No. 6., 1996, pp. 547-554.

May, N. et al., "SAP HANA—The Evolution of an In-Memory DBMS from Pure OLAP Processing Towards Mixed Workloads," BTW, 2017, pp. 545-563.

Menon, P. et al., "Relaxed Operator Fusion for In-Memory Databases: Making Compilation, Vectorization, and Prefetching Work Together at Last," Proc. of the VLDB Endowment, vol. 11, No. 1, 2017, pp. 1-13.

Müller, I. et al., "Adaptive String Dictionary Compression in In-Memory Column-Store Database Systems," Open Proceedings, 10.5441/002/edbt.2014.27, 2014, pp. 283-294.

Müller, I. et al., "Retrieval and Perfect Hashing Using Fingerprinting." J. Gudmundsson and J. Katajainen (Eds.), SEA 2014: Experimental Algorithms, Springer International Publishing, 2014, pp. 138-149.

Nehme, R. and Bruno, N., "Automated Partitioning Design in Parallel Database Systems," In ACM SIGMOD, 2011, pp. 1137-1148.

Neumann, T., Efficiently Compiling Efficient Query Plans for Modern Hardware, Proc. of the VLDB Endowment, vol. 4, No. 9, 2011, pp. 539-550.

Nica, A. et al., "Statisticum: Data Statistics Management in SAP HANA," Proc. of the VLDB Endowment, vol. 10, No. 12, 2017, pp. 658-1669.

On, S.T. et al., "FD-Buffer: A Buffer Manager for Databases on Flash Disks," ACM CIKM '10, Oct. 25-29, 2010, pp. 1297-1300.

Oracle® Database—Database In-Memory Guide, 19c, E96137-03, downloaded from https://docs.oracle.com/en/database/oracle/oracle-database/19/inmem/, Copyright 2016, 2020, 255 pages.

Pathak, A. et al., "Adaptive storage and access for simplified data management," *DaMoN* '19, Jul. 1, 2019, 6 pages.

Plaisance, J. et al., "Vectorized VByte Decoding," 1$^{st}$ Int'l Symp. on Web AlGorithms, Jun. 2015, 7 pages.

Plattner, H., "The Impact of Columnar In-memory Databases on Enterprise Systems: Implications of Eliminating Transaction-Maintained Aggregates," Proc. of the VLDB Endowment, vol. 7, No. 13, Sep. 1-5, 2014, pp. 1722-1729.

Poess, M. and Potapov, D., "Data Compression in Oracle," Proc. of the VLDB Conference, 2003, pp. 937-947.

Sacco, G.M. and Schkolnick, M., "A Mechanism For Managing The Buffer Pool In A Relational Database System Using Tire Hot Set Model," Proc. of the Eighth Int'l. Conf. on Very Large Data Bases, Sep. 1982, pp. 257-262.

(56) References Cited

OTHER PUBLICATIONS

Sherkat, R. et al., "Page As You Go: Piecewise Columnar Access In SAP HANA," ACM SIGMOD '16, Jun. 26-Jul. 1, 2016, pp. 1295-1306.
Stoica, R. and Ailamaki, A., Enabling Efficient OS Paging for Main-Memory OLTP Databases. ACM DaMoN '13. 2013, 7 pages, 2013.
Willhalm, T. et al., "Vectorizing Database Column Scans with Complex Predicates," ADMS 2013, pp. 1-12.
Xie, D. et al., "Simba: Efficient In-Memory Spatial Analytics," ACM SIGMOD '16, Jun. 26-Jul. 1, 2016, pp. 1071-1085.
Zilio, D.C. et al., "DB2 Design Advisor: Integrated Automatic Physical Database Design," Procs. of the $30^{th}$ VLDB Conference, 2004, pp. 1087-1097.

\* cited by examiner

CONTENT AGNOSTIC MEMORY PAGEABLE STORAGE MODEL

CROSS-REFERENCE TO RELATED APPLICATION

This application claims priority to provisional patent application no 62/858,693, titled "Native Store Extension for Combined Workload Databases" to Sherkat et al, filed Jun. 7, 2019, which is herein incorporated by reference in its entirety.

BACKGROUND

Systems typically store particular data objects in in-memory storage. However, in doing so, systems require a full memory footprint of the data objects. Since some data objects can be very large, their corresponding memory footprint can also be large. Along these lines, in many systems, the in-memory database typically has a limited capacity. Thus, systems can have limited capacity in the amount of data objects that can be stored. Accordingly, the total cost of ownership for storing data objects is high.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
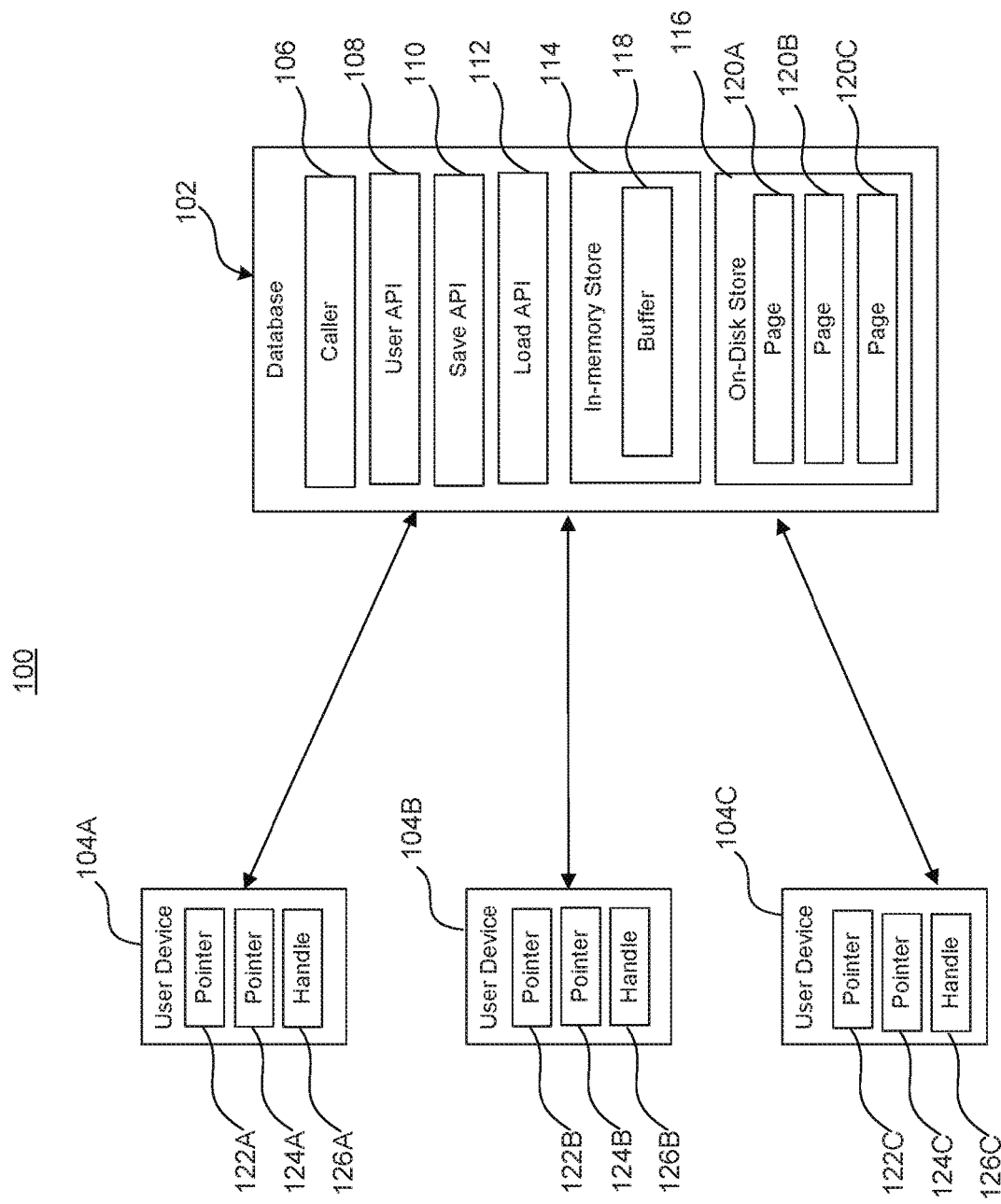
FIG. 1 is a block diagram of a system for storing an object on one or more pages, according to some embodiments.

Provided herein are system, apparatus, device, method and/or computer program product embodiments, and/or combinations and sub-combinations thereof, for storing an object on one or more pages of a persistent storage medium of a database.

In some embodiments, when storing an object in an on-disk store of a database, a database can identify the first available page of a chain of pages having unused space. The database can then determine if the size of the object exceeds the unused space of the specific memory page. If not, the database can generate (e.g., write) a single data block comprising the bytes of the object and store the data block corresponding to the object on the particular page. However, the database can also determine that the size of the object is larger than the unused space of the first available memory page. For example, in some embodiments, the first available memory page can be storing another object's data block. Further, in some embodiments, although the first available memory page cannot be storing another object's data block, the first available memory page can still nonetheless not be large enough to store the object.

Accordingly, when the size of the object exceeds the first available page, the database can generate multiple data blocks having one or more bytes of the object and save the data blocks on one or more pages in a columnar format. For example, in some embodiments, the database can generate a first data block to occupy the available (e.g., remaining) space available on the first available page. And, the database can create additional data blocks to occupy up to the capacity of subsequent pages following the first available page. Thus, the database can generate a second and third data block comprising one or more data bytes so long as the second and third data blocks do not comprise more data bytes than provided by the first and second available pages, respectively. In turn, in some embodiments, data blocks—comprising the same or different number of bytes and corresponding to different objects—can be stored on the same page. Along these lines, in some embodiments, a particular object can comprise multiple data blocks—including the same or different numbers of bytes—stored on separate pages.

Moreover, in storing data blocks on one or more pages, the database can load the pages into an in-memory store and write the data blocks onto the pages. The database can also record a location of the object's first data block on the first available page. The location can specify a particular page and an offset on the page from which the object's first data block begins. The database can then create a logical pointer for the first data block's location in the on-disk store. The logical pointer can include the location and/or the total number of bytes of the object. The database can then send the logical pointer to the user for loading the object. The logical pointer can then be used as a key to access the object.

Accordingly, when requesting the loading of the first object, the user can send the logical pointer to the database. The database can then utilize the logical pointer to locate the first data block of the object and determine whether the object is saved on one or multiple pages. If the object is saved on one page, the database can load the page into the in-memory store. The database can then return a pointer to a location in the in-memory store and a page handle for ensuring that the page is not removed from (e.g., flushed out of) the in-memory store. However, if the object is saved on multiple pages, the database can load the data blocks into a buffer of the in-memory store database. This allows the user to access data relating to the object. By operating in such a fashion, database 102 is able to provide a lower cost of ownership for data objects, as well as provide a smaller footprint for them.

FIG. 1 a system 100 for storing an object on one or more pages. System 100 can include database 102 and/or client devices 104A-C. Database 102 can be in communication with client devices 104A-C and can receive a request to store various objects. The objects can be of any size and/or shape. In some embodiments, the objects can include any type of data, such as geometric data (e.g., a polygon). Along these lines, the objects can be of fixed and/or variable sizes. For example, in some embodiments, the objects can be very large (e.g., 800,000 bytes). In some embodiments, the objects can be small (e.g., 100,000 bytes).

Database 102 can include caller 106, application program interface (API) 108, save API 110, load API 112, in-memory store 114, and/or on-disk store 116. In-memory store 114 can include a buffer 110 for receiving data of objects. On-disk store 118 can comprise one or more pages 120A-C for storing objects. Although on-disk store 118 is illustrated, database 102 may include any type of persistent storage medium, such as a solid-state device and a non-volatile memory device. Pages 120A-C can be a column database of a fixed-length contiguous block of memory (e.g., virtual memory). Pages 120A-C can be of the same or different size. For example, in some embodiments, pages 120A-C can each be 256K bytes. Pages 120A-C can also be different sizes (e.g., 64K bytes, 128K bytes, and 256K bytes, respectively).

Caller 106 can manage data received and returned from database 102. Accordingly, caller 106 can be in communication with user API 108, save API 110 and/or load API 112 to store and/or retrieve objects to and/or from on-disk store 118, as will be described in more detail below. Database 102's user API 108 can receive requests to save objects from user devices 104A-C. In some embodiments, user API 108 can also provide user devices 104A-C with a single page storage option or a multi-page storage option. Upon the selection of the single page storage option, caller 106 can attempt to save the object on a single page 120A. In some embodiments, page 120A can contain data blocks of other objects and contain sufficient storage capacity to store the object. In some embodiments, page 120A can not contain data blocks of any other objects and contain sufficient storage capacity to store the object. In some embodiments, although sufficient memory remains on a particular page 120A to store the object (e.g., when another object's block is stored on page 120A), caller 106 can store the object on a subsequent page 120B. This can be done upon the user's request.

Further, in some embodiments, although the user selected the single page storage option, caller 106 can determine that the object cannot be saved on a single page 120A and store the object on multiple pages 120A-C using save API 110. Along these lines, in some embodiments, although the object can be stored on a single page 120A, the object can be stored on multiple pages 120A-C. Thus, database 102's ability and/or inability to save the object on a single page 120A can be unknown to the user.

Further, in some embodiments, user API 108 can provide user devices 104A-C with a single page storage option or a multi-page storage option. Thus, database 102 stores the object as a single data block on page 120A if possible (e.g., when the object is less than or equal to page 120A's capacity). Otherwise, database 102 stores the object on multiple pages 120A-C. In doing so, as will be discussed in more detail below, database 102 can segment the object into multiple data blocks. Accordingly, in some embodiments, users can be unaware of the object being stored on a single page 120A or multiple pages 120A-C. In turn, users can also be unaware of whether the object is stored using a single data blocks or multiple data blocks.

Figure 2:
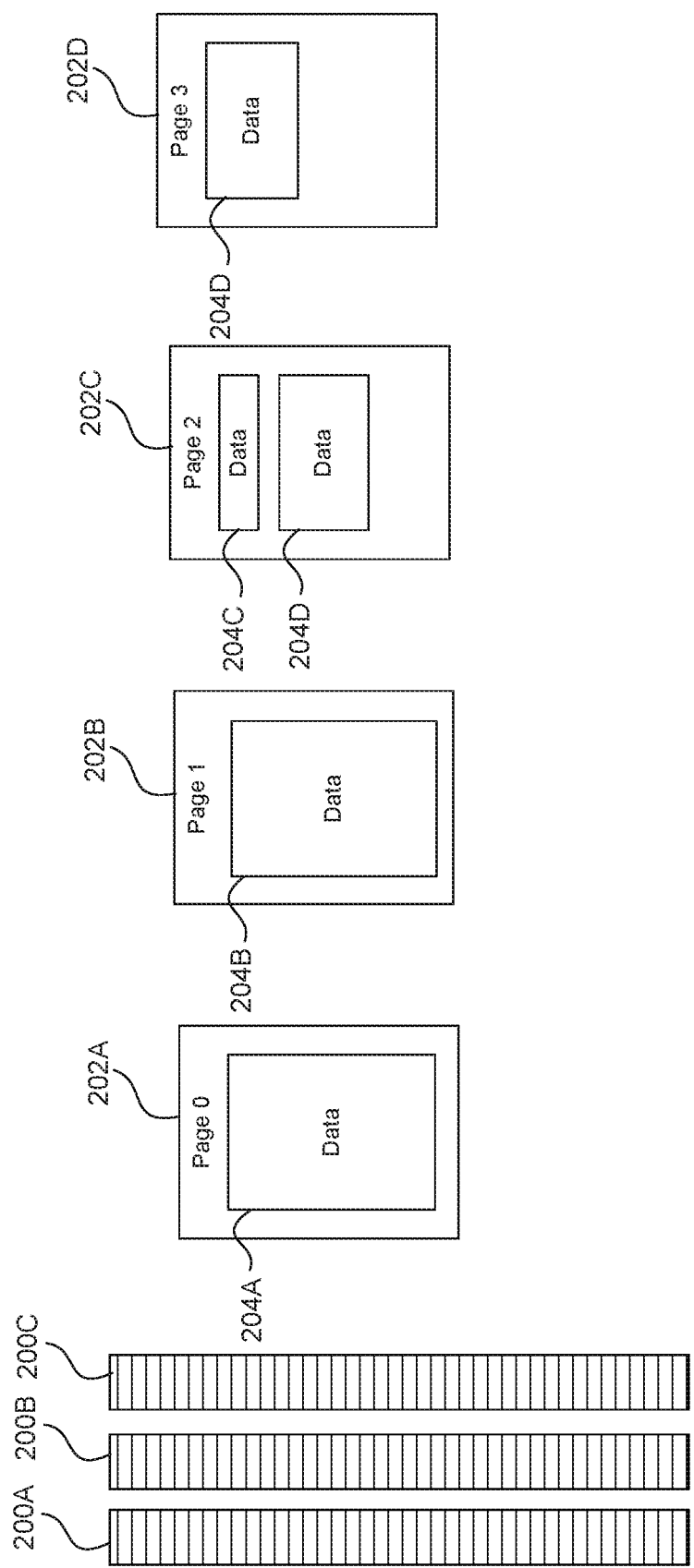
FIG. 2 is a process for storing various objects on one or more pages, according to some embodiments.

Database 102's caller 106 can store objects on on-disk store 118's pages 120A-C in a columnar format. FIG. 2 illustrates an example process for storing various objects (not illustrated) on pages 202A-D. The objects can be represented by index vectors 200A-C. In some embodiments, the objects can be of different sizes, and thus the corresponding index vectors 200A-C can be of different sizes. In some embodiments, objects and corresponding index vectors 200A-C can be chosen intentionally to store these data structures in contiguous memory.

Save API 110 (of FIG. 1) can analyze the chain of pages 202A-D, Database 102 can then identify the first page 202A having unutilized memory. In some embodiments, page 202A of a chain of pages 202A-D such that page 202A is followed by page 202B followed by page 202C followed by page 202D. Save API 110 can determine whether an object corresponding to a particular index vector 200A can be saved on a single page 202A. If not possible, caller 106 (of FIG. 1) can then store the object on multiple pages 202A-D. Save API 110 can then create data blocks 204A-E of a particular size depending on the amount of data of index vectors 200A-D and the size of the page 202A-D. Accordingly, data blocks cannot be larger than pages 202A-D.

For example, as illustrated, save API 110 (of FIG. 1) can determine that the data of index vector 200A can be stored entirely on page 202A. Thus, save API 110 (of FIG. 1) can store a single data block 204A—representing—index vector 200A—on page 202A. Data block 204A can fully utilize page 202A's storage capacity. Thereafter, save API 110 can determine that the data of index vector 200B exceeds page 202B's storage capacity, which follows page 202A. In doing so, save API 110 can determine that data of index vector 200B requires utilizing all of page 2029 and at least a portion of page 202C. Therefore, save API 110 can create multiple data blocks 204B and 204C representing data of index vector 200B. As illustrated, data block 20413 can represent a larger portion of index vector 200B's data then data block 204C. Accordingly, data blocks 20413 and 204C can be of different sizes and represent the same index vector 200B. Save API 110 can then store data blocks 204B and 204C on different pages 202B and 202C, respectively. Data block 204B can utilize the entire page 202B's capacity. Data block 204C can utilize a portion of pages 202C's capacity, Further, save API 110 (of FIG. 1) can determine that the data of index vector 200C can be entirely stored on page 202C, which, as described above, also stores data block 204C, Accordingly, save API 102 can create data block 204D representing index vector 200C. Save API 110 can then store data block 204D on page 202C. Data block 204D can utilize at least a portion of pages 202C's capacity. Accordingly, data blocks 204C and 204D—representing index vectors 200C and 200D, respectively—utilize all or a portion of page 202C's capacity.

In some embodiments, as discussed above, save API 110 (of FIG. 1) can receive a user's request that the object—corresponding to data of index vector 200C—be stored on a separate page 202D. Accordingly, although storage space remains on page 202C, save API 110 can store data block 204D on page 202D. Thus, in some embodiments, like page 202C, page 202D can also have unutilized storage space.

As described above, in some embodiments, pages 202A and 202B can be fully utilized and store a single data block 204A-B. In some embodiments, page 204C can be partially utilized and store multiple data blocks 204C and 204D. Further, in some embodiments, page 202D can be partially utilized and store a single data block 204D. Thus, pages 202A-D can store one or multiple data blocks 204A-D and correspond to the same or different index vectors.

Accordingly, save API 110 (of FIG. 1) can load the appropriate pages 202A-C into in-memory store 118. Save API 110 can then store data blocks 204A-C on pages 202A-C at their appropriate locations. After doing so, save API 110 can send the pages 202A-C back in on-disk store 116.

Additionally, save API 110 (of FIG. 1) can record a location of the object's first data block on pages 202A-D, As described above, save API 110 can store data blocks 204A-D on pages 202A-D in a columnar format. As also described above, pages 202A-D can be of a particular size (e. 256K bytes). Further, objects can be of various sizes and thus comprise different amounts of bytes. In turn, data blocks 204A-D can be of various sizes and therefore include varying amounts of bytes. Thus, save API 114 can record the location of the first block of a particular object relative to a byte on pages 202A-D. For example, since data block 204A and 204B are the first data blocks on pages 202A and 202B, their location can be page 202A, byte 0, and page 202B, byte 0, respectively. And since data block 204D follows data block 204C on page 202O, data block 204D's location can be page 202C, byte 120K (or some other nonzero number).

Along these lines, save API 110 (of FIG. 1) can align data blocks 204A-D on pages 202A-D. In doing so, in some embodiments, save API 110 can offset each data block 204A-D by a nonzero number of bytes (e.g., 8 bytes. 16 bytes, 32 bytes). Thus, save API 110 can save data blocks 204 that are not the first data block on pages 202A-D at a byte divisible by the nonzero number of bytes (e.g., 16). For example, if data block 204C ends on page 202C's byte 120, data block 204 can store data block 204D at pages 202C's byte 128—which is the first byte after byte 120 divisible by 16. This can allow the data blocks to be loaded faster without increasing the object's memory footprint.

Figure 3:
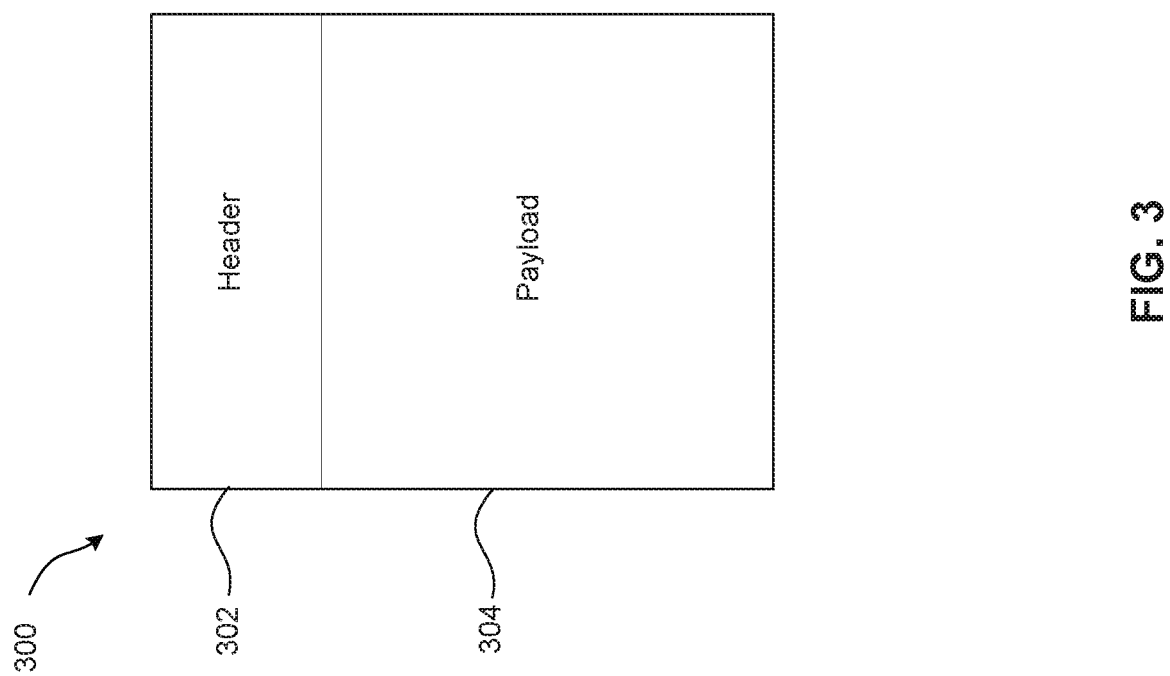
FIG. 3 is a data block stored on a page, according to some embodiments.

FIG. 3 illustrates an example of data block 300 created by save API 110 (of FIG. 1). Block 300 includes header 302 and payload 304. Header 302 can include metadata unique to block 300 and optionally, metadata provided by a user. Metadata unique to the block 300 can include metadata flags, for example stating that block 300 is a first or last block relating to a particular object. Metadata unique to the user can be a particular size and/or type of an object stored in payload 304. Further, payload 304 can include data of the actual object (e.g., index vectors 200A-C of FIG. 1).

Referring to FIG. 1, in storing the object on pages 120A-C, save API 112 can create a logical pointer 122A-C relating to the location of the object. In some embodiments, logical pointer 122A-C can include a location of the object's first data block and/or a number of bytes of the object. The location can specify a particular page 118A and an offset on the page 118A from which the object's first data block begins. Database 102 can then send logical pointer 122A-C to the user. Logical pointer 122A-C can then be used as a key to access the object.

Accordingly, users can request access to an object using logical pointer 122A-C. In some embodiments, users may not have personally stored the object on on-disk store 118 (e.g., pages 120A-C). In some embodiments, users can be unaware of whether the object was stored on one or multiple pages 120A-C. In some embodiments, upon receipt of the request, database 102's user API 108 can provide users a page-map-mode option, a full copy mode option, and/or a convenience mode option. User API 108 can then forward the request to load API 112. In some embodiments, upon receipt of the request, and without input from a user, load API 112 can determine whether to utilize a page map mode or a full copy mode based on whether the object is stored on a single page 120A-C or multiple pages 120A-C.

The page map mode can be available for objects stored on a single page 120A-C. Database 102 can then retrieve data from on-disk store 116 and store it in in-memory store 114. For example, in some embodiments, database 102 can retrieve an appropriate pages 202A-C comprising a single data block 204A-C (of FIG. 2) pertaining to the object and store the appropriate page 202A-C in in-memory store 114. Database 102 can send pointer 124A-C and handle 126A-C to maintain the user. Pointer 124A-C can specify a location of the appropriate page 202A-C in in-memory store 114. Handle 126A-C can permit a user to ensure that data relating to the object (e.g., an appropriate page 204A-C) is not removed from in-memory store 114 while it is being utilized.

Further, the full copy mode can be available for objects stored on multiple pages 120A-C. As described above, objects stored on multiple pages 120A-C comprise multiple data blocks. Thus, in the full copy mode, database 102 can retrieve data from data blocks from each page 120A-C iteratively and store them in buffer 110. in doing so, buffer 110 can contain data of all or part of a particular page I20A-C at a particular time before database 102 flushes buffer 110 for storing data of another object.

The convenience mode can be available for users who are unaware of the object being stored on a single or multiple pages 120A-C. Accordingly, database 102 can determine the object being stored on a single or multiple pages 120A-C and operate according to the page map mode or the full copy mode based on this determination.

Additionally, after retrieving data blocks of objects from on-disk store 116 and storing the data blocks in in-memory store 114, database 102 can permit a user to rewrite new and/or different data onto the object's data blocks 202A-D so long as the new and/or different data does not exceed the size of the preexisting data stored on data blocks 202A-D. For example, in some embodiments, the user can provide different metadata in a header of the data block of the object. In some embodiments, the user can also have new and/or different data relating to a different object be written onto the data blocks of the object. Along these lines, in some embodiments, where new and/or different data corresponding to a new object is provided onto existing blocks, sonic data blocks and/or portions of data blocks cannot be utilized.

Figure 4:
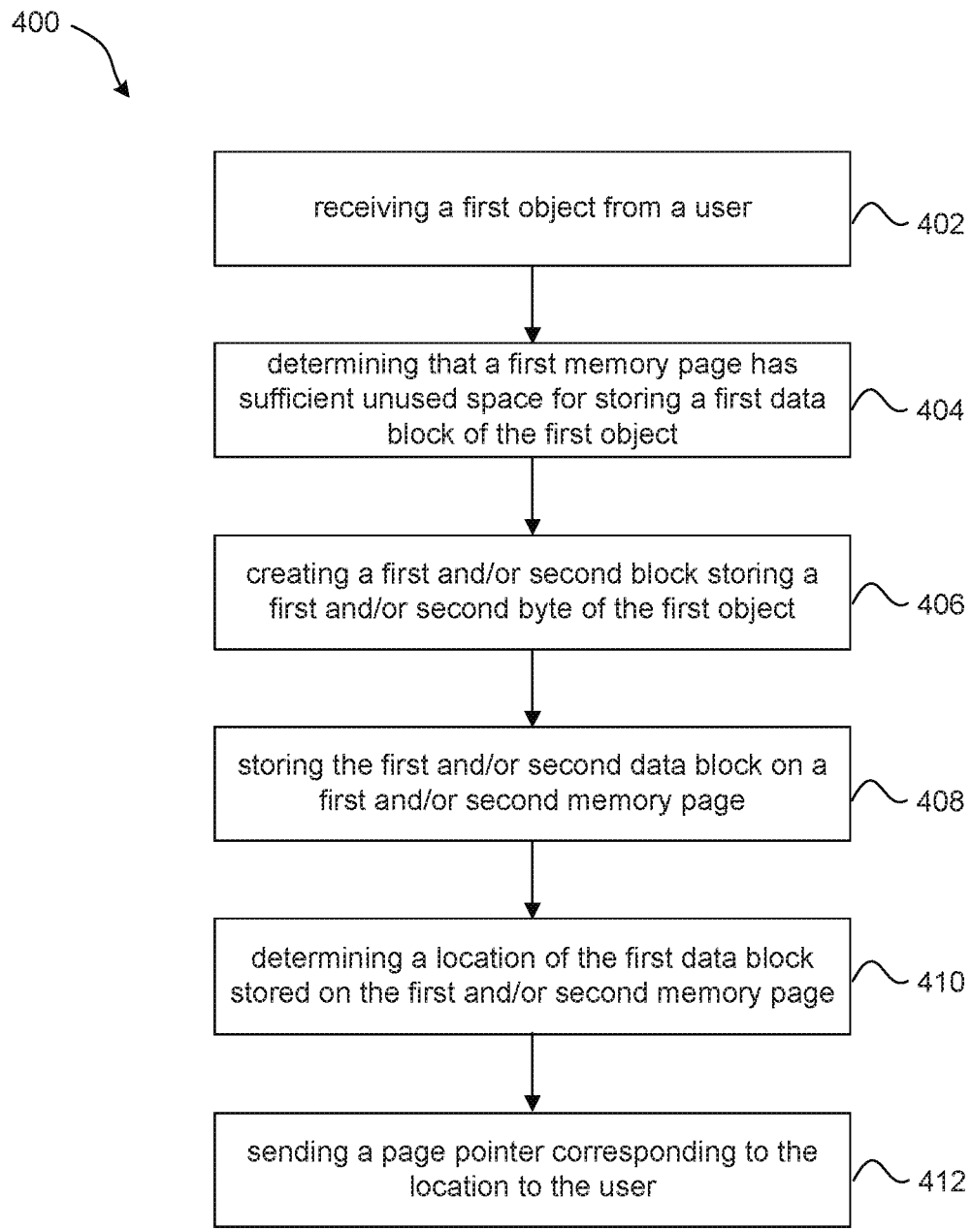
FIG. 4 is a flowchart illustrating a process for storing an object on one or more pages, according to some embodiments.
Figure 5:
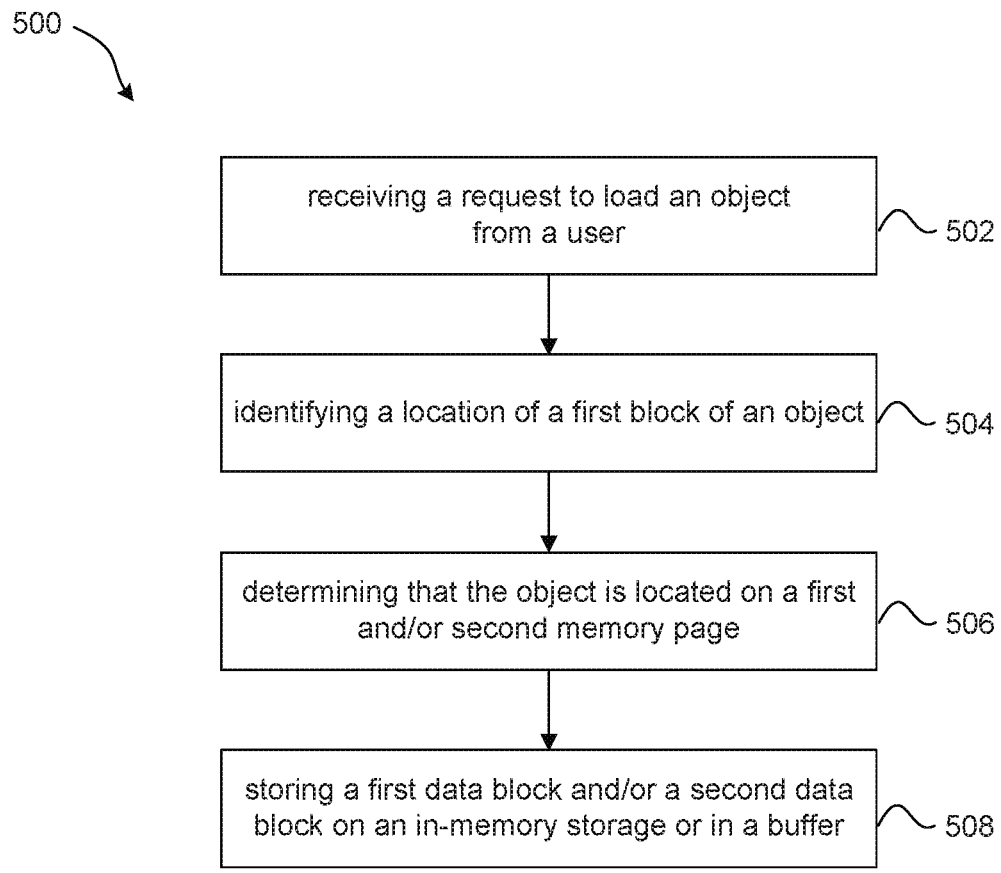
FIG. 5 is a flowchart illustrating a process for loading an object on one or more pages, according to some embodiments.

FIG. 4 is a flowchart for method 400 for saving an object on one or more pages, according to some embodiments. FIG. 5 is a flowchart for method 500 for loading an object from one or more pages, according to some embodiments. Methods 400 and 500 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, sonic of the steps can be performed simultaneously or in a different order than shown in FIGS. 3 and 4, as will be understood by a person of ordinary skill in the art.

Referring to FIG. 4, method 400 shall be described with reference to FIGS. 1 and 2. However, method 400 is not limited to those example embodiments.

At 402, database 102 receives an object from a user. The object can be of a particular size and include a predefined number of bytes (e.g., 250 bytes, 400 bytes, or 1K bytes). For example, in some embodiments, the object can comprise two bytes—i.e., a first byte and a second byte.

At 404, database 102 determines that page 202A-B has sufficient unused space for storing the first byte and/or the second byte. Database 102 can first determine that page 2024-B is the first available page in a chain of pages that has unused storage. Database 102 can thereafter determine if the unused storage is sufficient for storing one or both of the first byte and second byte. Accordingly, in sonic embodiments, database 102 can determine that page 202A-B has sufficient unused space for storing the entire object—i.e., the first byte and the second byte. In some embodiments, database 102 can determine that page 202A-B has sufficient unused space for storing the first byte (i.e., not the second byte).

At 406, database 102 creates a first data block 204A-C and/or a second data block 204A-C comprise the first byte and/or the second byte of the object. Thus, in embodiments where first page 202A does have sufficient unused space for storing the entire object, database 102 may create a single data block 2044. Thus, data block 2024 may store all of the object's bytes. In some embodiments where first page 202B does not have sufficient unused space to store the entire object's bytes, database 102 may create multiple data blocks 204B and 204C. Data block 204B may include a number of object's bytes equal to the remaining unused portion on page 202B. Data block 204C may include the remaining number of object's bytes so long as the remaining number does not exceed the next page 202C's capacity.

At 408, database 102 stores the first data block and/or the second data block of the object on a first page or a second page.

At 410, database 102 determines the location of the object's first data block 204A-C stored on the first page 202A-C. The location can be a page number and an offset of the first data block on the page. Accordingly, the offset can be the first byte on the page for which the first data block starts.

At 412, database 102 sends a logical pointer corresponding to the location of the object's first data block for loading the first object to the user. Thus, the user can use the logical pointer to access the object at a later time.

Referring to FIG. 5, method 500 shall be described with reference to FIGS. 1 and 2. However, method 500 is not limited to those example embodiments.

At 502, database 102 receives a request to load an object stored on a first and/or second page 202A-D. As described above, in some embodiments, an object may be stored on a single page 202A. In some embodiments, an object may be stored on multiple pages 202A-D. Accordingly, in some embodiments, a user may be unaware of the object being stored on a single page 202A or multiple pages 202A-D.

At 504, database 102 identifies a location of the first data block of an object. As stated above, the request can include a pointer 122A-C corresponding to a location of the object's first block 202A-D in on-disk store 116. As such, the location can be a page number and an offset of the first data block on the page. And, the offset can be the first byte on the page for which the first data block starts.

At 506, database 102 determines that the object is located on a first and/or second page 202A-D. As described above, with respect to 502, the object can be stored entirely on a single page 202A or on multiple pages 202A-D.

At 508, database 102 stores a first data block and/or a second data block on in-memory store 114 or in buffer 110. In some embodiments, where the object is stored on a single page 202A, database 102 retrieve the page 202A from on-disk store 116 and stores the page in in-memory store 115. Database can then send pointer 124A-C and handle 126A-C to the user. Pointer 124A-C can provide a location in in-memory store 114 relating to the first objection. Handle 126 can ensure the is not flushed from in-memory store out during a period of time (e.g., while the user accesses or utilizes the object). In some embodiments, where the object is stored across multiple pages 202A-D, each data block 204A-D is copied and stored in buffer 110. Database 102 then provides users access to data stored on in buffer 110.

Figure 6:
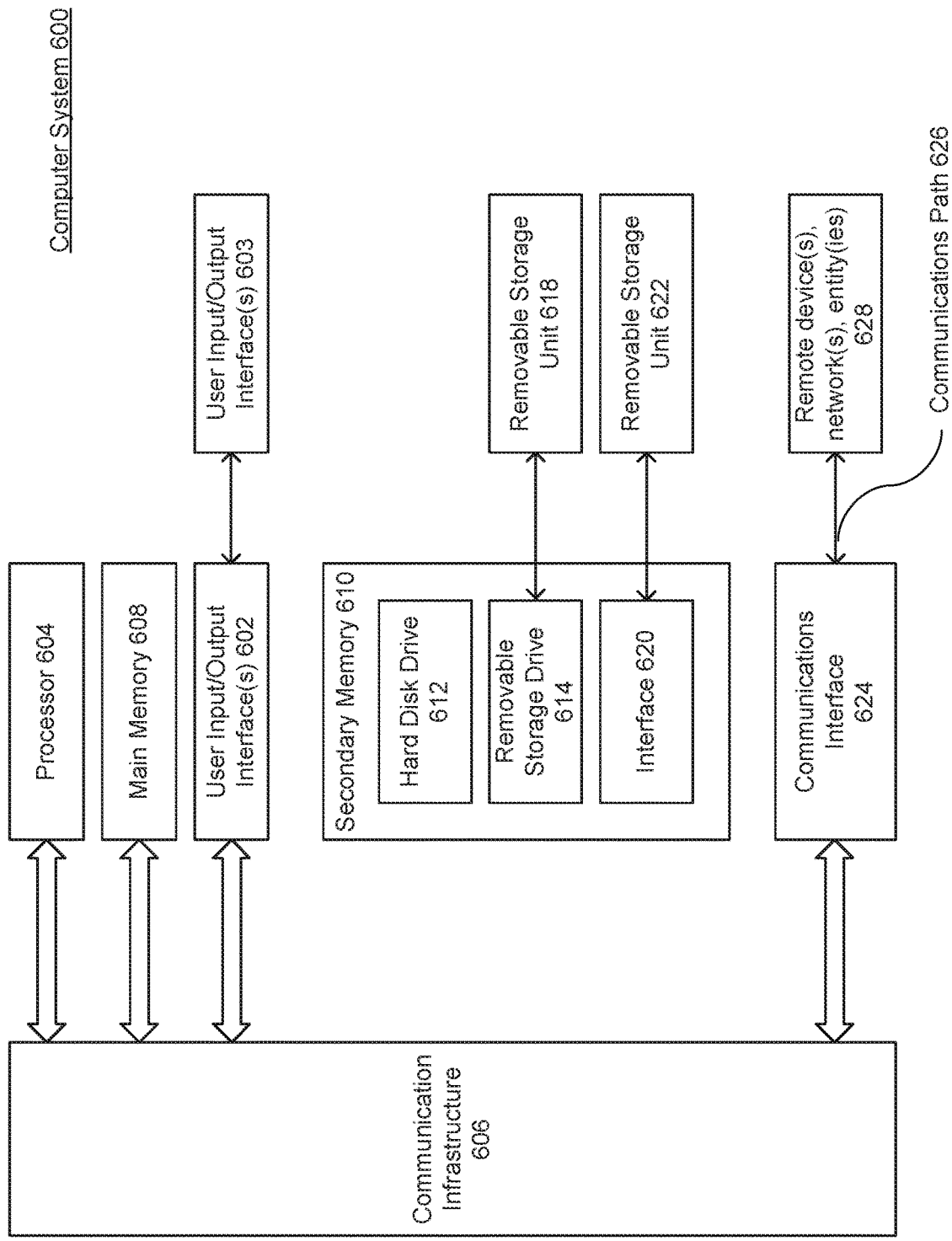
FIG. 6 is an example computer system useful for implementing various embodiments.

Various embodiments can be implemented, for example, using one or more well-known computer systems, such as computer system 600 of FIG. 6. One or more computer systems 600 can he used, for example, to implement any of the embodiments discussed herein, as well as combinations and sub-combinations thereof.

Computer system 600 can include one or more processors (also called central processing units, or CPUs), such as a processor 604. Processor 604 can be connected to a communication infrastructure or bus 606.

Computer system 600 can also include user input/output device(s) 603, such as monitors, keyboards, pointing devices, etc., which can communicate with communication infrastructure 606 through user input/output interface(s) 602.

One or more processors 604 can be a graphics processing unit (GPU). In an embodiment, a GPU can be a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 600 can also include a main or primary memory 608, such as random access memory (RAM). Main memory 608 can include one or more levels of cache. Main memory 608 can have stored therein control logic (i.e., computer software) and/or data.

Computer system 600 can also include one or more secondary storage devices or memory 610. Secondary memory 610 can include, for example, a hard disk drive 612 and/or a removable storage device or drive 614. Removable storage drive 614 can be a floppy disk drive, a magnetic tape drive, a compact disk drive, an optical storage device, tape backup device, and/or any other storage device/drive.

Removable storage drive 614 can interact with a removable storage unit 618. Removable storage unit 618 can include a computer-usable or readable storage device having stored thereon computer software (control logic) and/or data. Removable storage unit 618 can be a floppy disk, magnetic tape, compact disk, DVD, optical storage disk, and/ any other computer data storage device. Removable storage drive 614 can read from and/or write to removable storage unit 618.

Secondary memory 610 can include other means, devices, components, instrumentalities, or other approaches for allowing computer programs and/or other instructions and/ or data to be accessed by computer system 600. Such means, devices, components, instrumentalities, or other approaches can include, for example, a removable storage unit 622 and an interface 620. Examples of the removable storage unit 622 and the interface 620 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 can further include a communication or network interface 624. Communication interface 624 can enable computer system 600 to communicate and interact with any combination of external devices, external networks, external entities, etc. (individually and collectively referenced by reference number 628). For example, communication interface 624 can allow computer system 600 to communicate with external or remote devices 628 over communications path 626, which can be wired and/or wireless (or a combination thereof), and which can include any combination of LANs, WANs, the Internet, etc. Control logic and/or data can be transmitted to and from computer system 600 via communication path 626.

Computer system 600 can also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 600 can be a client or database, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 can be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User interface Language (XUL), or any other functionally similar representations alone or in combination. Alternatively, proprietary data structures, formats, or schemas can be used, either exclusively or in combination with known or open standards.

In some embodiments, a tangible, non-transitory apparatus or article of manufacture comprising a tangible, non-transitory computer useable or readable medium having control logic (software) stored thereon can also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), can cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A computer-implemented method for storing a first object onto one or both of a first page and a second page, comprising:
    receiving a first object, wherein the first object comprises one or more bytes;
    determining that the first page has sufficient unused space for storing a first byte of the one or more bytes of the first object, wherein the first page stores a first data block of a second object comprising one or more bytes of the second object;
    creating a first data block of the first object to comprise the first byte of the first object;
    storing the first data block of the first object on the first page or the second page, wherein the second page is consecutive to the first page;
    determining a location of the first data block of the first object stored on the first page or the second page; and
    responding to the receiving of the first object with a first pointer corresponding to the location of the first data block of the first object.

2. The computer-implemented method of claim 1, further comprising:
    providing a first option and a second option, wherein the first option corresponds to storing the one or more bytes of the first object on a single page, wherein the second option corresponds to storing the first data block of the first object and a second data block of the first object on the first page and the second page, respectively, and wherein the second data block of the first object comprises a second byte of the one or bytes of the first object; and
    receiving a selection of the first option or the second option, wherein the storing of the first data block of the first object on the first page or the second page is based on the selection of the first option or the second option.

3. The computer-implemented method of claim wherein the first byte comprises each of
the one or more bytes of the first object, and the determining of the first page comprising:
determining that the first page has sufficient unused space for storing the one or more bytes of the first object,
the creating of the first data comprising:
creating the first data block of the first object to comprise the one or more bytes of the first object.

4. The computer-implemented method of claim the storing of the one or both of the first data block of the first object and the second data block of the first object comprising:
storing the first data block of the first object on the second page.

5. The computer-implemented method of claim 1, the storing of the first data block of the first object on the first page or the second page comprising:
storing the first data block of the first object on the first page.

6. The computer-implemented method of claim 5, the storing of the first data block of the first object on the first page or the second page further comprising:
aligning the first data block of the first object with the first data block of the second object.

7. The computer-implemented method of claim6, the aligning of the first data block of the first object comprising:
storing the first data block of the first object at an address after the first data block of the second object that is divisible by a specified integer.

8. The computer-implemented method of claim 1, further comprising:
creating a second data block of the first object to comprise second byte of the first object; and
storing the second data block of the first object the second page.

9. The computer-implemented method of claim 8, wherein one or both of the first data block of the first object and the first data block of the second object comprise a different number of bytes than the second data block of the first object on the second page.

10. The computer-implemented method of claim 8. wherein the first data block of the first object comprises a different number of bytes than the second data block of the first object.

11. The computer-implemented method of claim 8, further comprising:
providing a first flag and a second flag on the first data block of the first object and the second data block of the first object indicating that the first data block of the first object and the second data block of the first object are a first data block and a last data block for the first object, respectively.

12. The computer-implemented method of claim 8, further comprising:
receiving a request to load the first object, wherein the request includes the first pointer;
determining the location of the first data block of the first object based on the first pointer;
determining that the first object is stored on the first page and the second page; and
storing data of the first data block stored on the first page and second page, respectively, in a buffer of an in-memory store.

13. The computer-implemented method of claim 1, wherein the first pointer comprises a page number and an offset, the page number corresponding to the first page or the second page, and the offset corresponding to a byte distance from a beginning of the first page or the second page where the first data block of the first object resides.

14. The computer-implemented method of claim 1, further comprising:
receiving a request to load the first object, wherein the request includes the first pointer;
determining the location of the first data block of the first object based on the pointer;
determining that the first object is stored on the first page or the second page;
retrieving the first object from the first page or the second page; and
storing data relating to the first data block of the first object in an in-memory.

15. The computer-implemented method of claim 14, further comprising:
responding to the receiving of the request to load the first object with a second pointer,
wherein the second pointer includes a location of the data relating to the first data block of the first object stored in the in-memory store.

16. The computer-implemented method of claim 14, further comprising:
responding to the receiving of the request to load the first object with a handle,
wherein the handle ensures that the data relating to the first data block of the first object remains stored in the in-memory store.

17. A system, comprising:
a memory; and
a processor coupled to the memory and configured to:
receive a first object, wherein the first object comprises one or more bytes;
determine that a first page has sufficient unused space for storing a first byte of the one or more bytes of the first object, wherein the first page stores a first data block of a second object comprising one or more bytes of the second object;
create a first data block of the first block to comprise the first byte of the first object;
store the first data block of the first on the first page or a second page, wherein the second page is consecutive to the first page
determine a location of the first data block of the first object stored on the first page or the second page; and
responding to the receiving of the first object with a first pointer corresponding to the location of the first data block of the first object.

18. The system of claim 17, wherein the processor is further configured to:
provide a first option and a second option, wherein the first option corresponds to storing the one or more bytes of the first object on a single same page, and wherein the second option corresponds to storing the first data block of the first object and a second data block of the first object on the first page and the second page, respectively, and wherein the second data block of the first object comprises a second byte of the one or more bytes of the first object; and
receive a selection of the first option or the second option, wherein the storing of the first data block of the first object on the first page or the second page is based on the selection of the first option or the second option.

19. The system of claim 17, wherein the processor is further configured to:
- receive a request to load the first object, wherein the request includes the first pointer;
- determine a location of the first data block of the first object based on the pointer;
- determine that the first object is stored on the first page or the second page;
- retrieve the first object from the first page or the second page;
- store data relating to the first data block of the first object in an in-memory store or a buffer based on the first object being stored on the first page or the second page; and
- responding to the receiving of the request to load the first object with a second pointer and a handle,
- wherein the second pointer includes a location of the first data block of the first object stored in the in-memory store or the buffer, and
- wherein the handle ensures that the data relating to the first data block of the first object remains stored in the in-memory storage or buffer.

20. A non-transitory computer-readable device having instructions stored thereon that, when executed by a computing device, causes the computing device to perform operations comprising:
- receiving a first object, wherein the first object comprises one or more bytes;
- determining that a first page has sufficient unused space for storing a first byte of the one or more bytes, wherein the first page stores a first data block of a second object comprises one or more bytes of the second object;
- creating a first data block of the first object to comprise the first byte of the first object;
- storing the first data block of the first object on the first page or a second page, wherein the second page is consecutive to the first page;
- determining a location of the first data block of the first object stored on the first page or the second page; and
- responding to the receiving of the first object with a pointer corresponding to the location of the first data block of the first object.

* * * * *